(12) United States Patent
Nishikawa et al.

(10) Patent No.: US 10,018,722 B2
(45) Date of Patent: Jul. 10, 2018

(54) MEASUREMENT APPARATUS

(71) Applicant: CANON KABUSHIKI KAISHA, Tokyo (JP)

(72) Inventors: Yuya Nishikawa, Utsunomiya (JP); Yoshiyuki Kuramoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 15/057,561

(22) Filed: Mar. 1, 2016

(65) Prior Publication Data
US 2016/0266255 A1 Sep. 15, 2016

(30) Foreign Application Priority Data

Mar. 9, 2015 (JP) ................................ 2015-046345

(51) Int. Cl.
| | | |
|---|---|---|
| *G01B 11/14* | (2006.01) | |
| *G01S 17/42* | (2006.01) | |
| *H04N 5/225* | (2006.01) | |
| *G01S 17/89* | (2006.01) | |
| *H04N 9/04* | (2006.01) | |

(Continued)

(52) U.S. Cl.
CPC ............ *G01S 17/42* (2013.01); *G01S 7/4816* (2013.01); *G01S 17/023* (2013.01); *G01S 17/89* (2013.01); *H04N 5/2256* (2013.01); *H04N 5/357* (2013.01); *H04N 9/045* (2013.01); *G01B 11/14* (2013.01); *G06T 2207/10024* (2013.01)

(58) Field of Classification Search
CPC ........... G01N 21/6458; G01N 21/6428; G01N 15/1475; G01N 2015/1497; G01N 2021/653; G01N 21/255; G01N 21/31; G01N 21/6445; G01N 21/65; G01N 2333/4603; G01N 33/5026; G01N 2021/1793; G01N 2021/3137
See application file for complete search history.

(56) References Cited

U.S. PATENT DOCUMENTS

| | | | |
|---|---|---|---|
| 6,628,322 B1 * | 9/2003 | Cerruti ................... | B25J 9/1697 348/135 |
| 2003/0016366 A1 * | 1/2003 | Takeda ............... | G01B 11/2509 356/604 |

(Continued)

FOREIGN PATENT DOCUMENTS

| | | |
|---|---|---|
| JP | 5122729 B2 | 1/2013 |
| JP | 5393318 B2 | 1/2014 |

*Primary Examiner* — Michael P Stafira
(74) *Attorney, Agent, or Firm* — Rossi, Kimms & McDowell LLP

(57) ABSTRACT

The present invention provides a measurement apparatus for measuring one of a position and an attitude of a measurement target, including an image sensor including one pixel unit in which a plurality of pixels adjacent to each other are arranged in a matrix and configured to capture the measurement target illuminated with a pattern light of a first wavelength and a light of a second wavelength and obtain a first image corresponding to the pattern light of the first wavelength and a second image corresponding to the light of the second wavelength, and an optical member configured to separate the pattern light of the first wavelength and the light of the second wavelength and make one of the pattern light of the first wavelength and the light of the second wavelength enter each pixel of the one pixel unit.

13 Claims, 5 Drawing Sheets

(51) Int. Cl.
*H04N 5/357* (2011.01)
*G01S 17/02* (2006.01)
*G01S 7/481* (2006.01)

(56) References Cited

U.S. PATENT DOCUMENTS

| | | | | |
|---|---|---|---|---|
| 2010/0195114 A1* | 8/2010 | Mitsumoto | ......... | G01B 11/245 356/601 |
| 2015/0049345 A1* | 2/2015 | Miyagawa | ........... | G01B 11/002 356/625 |
| 2016/0267668 A1* | 9/2016 | Yamada | ............. | G01B 11/2509 |
| 2017/0069091 A1* | 3/2017 | Hatada | ................. | G02B 27/126 |

* cited by examiner

FIG. 2
FIG. 3
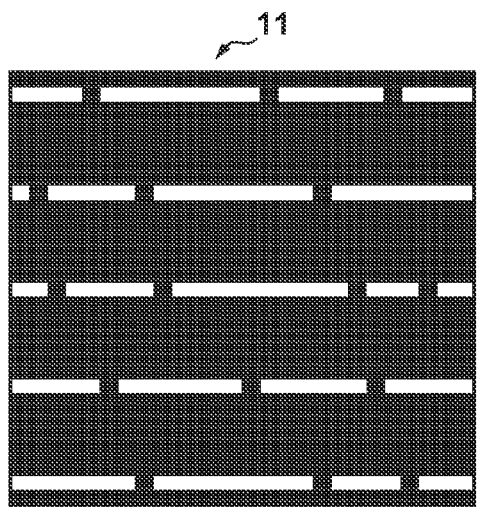
B: BLUE, R: RED
FIG. 4
FIG. 5
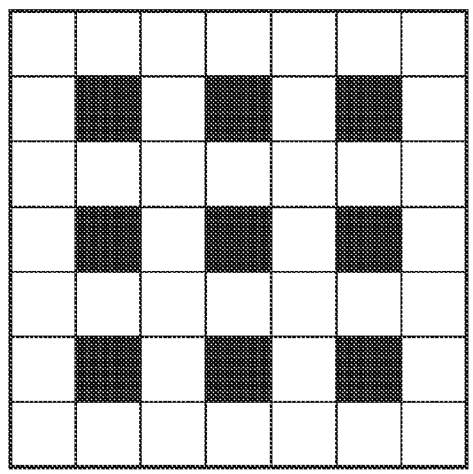
WHITE: EFFECTIVE PIXEL
BLACK: MISSING PIXEL
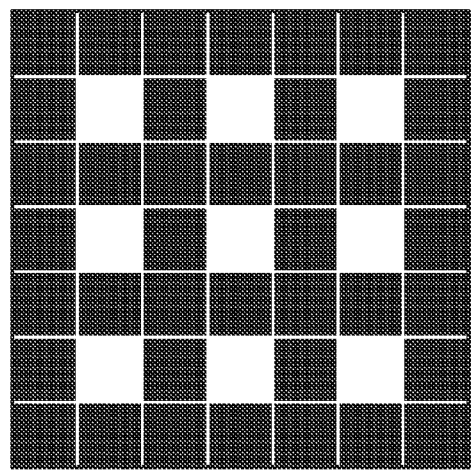
WHITE: EFFECTIVE PIXEL
BLACK: MISSING PIXEL
FIG. 6
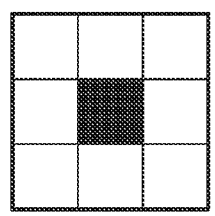
BLACK: MISSING PIXEL
WHITE: EIGHT PIXELS EXISTING
AROUND MISSING PIXEL

B: BLUE , R: RED

B: BLUE , R: RED

B: BLUE , R: RED

Ｕ S 10,018,722 B2

MEASUREMENT APPARATUS

BACKGROUND OF THE INVENTION

1. Field of the Invention

The present invention relates to a measurement apparatus that measures the position or attitude of a measurement target.

2. Description of the Related Art

In recent years, a complex task such as the assembly process of an industrial product, which is traditionally performed by a human, is done by a robot instead. The robot performs assembly by gripping a part by an end effector such as a hand. To implement such assembly, the position or attitude of an article (work) to be gripped needs to be measured.

For example, Japanese Patent No. 5393318 proposes a technique of measuring the position or attitude of a work by model fitting using measurement information (edge data) obtained from a grayscale image and measurement information (distance point group data) obtained from a range image. In this technique, the position or attitude of a work is estimated using maximum likelihood estimation, assuming that an error in the grayscale image and an error in the range image comply with different probability distributions. Hence, even if the initial condition is poor, the position or attitude of the work can stably be estimated.

Consider a case in which the position or attitude of a work is measured while moving a robot to speed up the assembly process. In this case, to guarantee the field shift between a grayscale image and a range image, it is necessary to simultaneously obtain the grayscale image and the range image. Japanese Patent No. 5122729 proposes a technique of simultaneously illuminating a work with light beams of different wavelengths using a grayscale image illumination unit and a range image illumination unit, separating the light beams of the wavelengths by a wavelength separation prism, and simultaneously capturing both images using a grayscale image sensor and a range image sensor.

However, the technique disclosed in Japanese Patent No. 5122729 needs a sensor for each of the grayscale image and the range image. Hence, problems (1), (2) and (3) arise.

(1) Since a plurality of sensors are necessary, the apparatus cost rises.

(2) Since a plurality of sensors need to be arranged, the apparatus size becomes large.

(3) Since a grayscale image and a range image are obtained by separate sensors, stability to a temperature variation such as heat generation of the illumination units or sensors poses a problem.

SUMMARY OF THE INVENTION

The present invention provides a measurement apparatus advantageous from the viewpoint of measurement accuracy, cost, size, or stability.

According to one aspect of the present invention, there is provided a measurement apparatus for measuring one of a position and an attitude of a measurement target, including a first illumination unit configured to illuminate the measurement target with pattern light of a first wavelength, a second illumination unit configured to illuminate the measurement target with light of a second wavelength different from the first wavelength, an image sensor including one pixel unit in which a plurality of pixels adjacent to each other are arranged in a matrix and configured to capture the measurement target illuminated with the pattern light of the first wavelength and the light of the second wavelength by the one pixel unit and obtain a first image corresponding to the pattern light of the first wavelength and a second image corresponding to the light of the second wavelength by the one pixel unit, an optical member arranged between the measurement target and the image sensor and configured to separate the pattern light of the first wavelength and the light of the second wavelength and make one of the pattern light of the first wavelength and the light of the second wavelength enter each pixel of the one pixel unit, and a processing unit configured to obtain information of one of the position and the attitude of the measurement target based on the first image and the second image.

Further aspects of the present invention will become apparent from the following description of exemplary embodiments with reference to the attached drawings.

BRIEF DESCRIPTION OF THE DRAWINGS

FIG. 2 is a view showing an example of the arrangement of the mask of a first illumination unit in the measurement apparatus shown in FIG. 1.

FIG. 3 is a view showing an example of the arrangement of a wavelength separation filter that is an optical member in the measurement apparatus shown in FIG. 1.

FIG. 4 is a view showing an example of a range image obtained by the measurement apparatus shown in FIG. 1.

FIG. 5 is a view showing an example of a grayscale image obtained by the measurement apparatus shown in FIG. 1.

FIG. 6 is a view for explaining interpolation of missing pixels in each of the range image and the grayscale image obtained by the measurement apparatus shown in FIG. 1.

DESCRIPTION OF THE EMBODIMENTS

Figure 1:
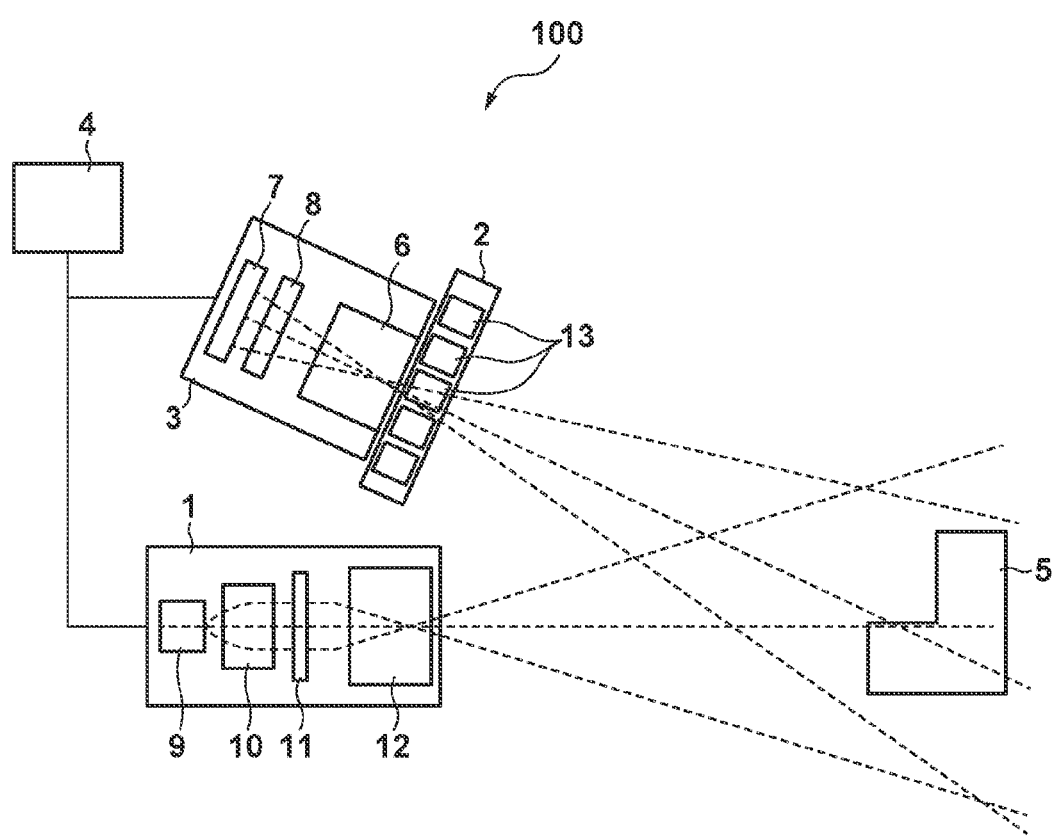
FIG. 1 is a schematic view showing the arrangement of a measurement apparatus according to an embodiment of the present invention.

Preferred embodiments of the present invention will be described below with reference to the accompanying drawings. Note that the same reference numerals denote the same members throughout the drawings, and a repetitive description thereof will not be given.

FIG. 1 is a schematic view showing the arrangement of a measurement apparatus 100 according to an embodiment of the present invention. The measurement apparatus 100 measures the position or attitude of, for example, a work 5 that is a measurement target using a pattern projection method.

As shown in FIG. 1, the measurement apparatus 100 includes a first illumination unit 1 for a range image, a second illumination unit 2 for a grayscale image, an image sensing unit 3, and a processing unit 4. The processing unit 4 obtains shape information of the work 5 such as 3D information or an edge of the work 5 based on a range image and a grayscale image obtained by the image sensing unit 3, as will be described later.

The measurement apparatus 100 is an apparatus that simultaneously obtains a range image and a grayscale image by a range image measurement unit and a grayscale image measurement unit, and performs model fitting using the two images, that is, the range image and the grayscale image, thereby measuring the position or attitude of the work 5. Note that the model fitting is performed for a CAD model of the work 5 created in advance and assumes that the 3D shape of the work 5 is known.

Each of the range image measurement unit configured to obtain a range image and the grayscale image measurement unit configured to obtain a grayscale image, which are main units of the measurement apparatus 100, will be described first.

The range image measurement unit will be described. A range image represents, for example, 3D information of (points on the surface of) the work 5 as a measurement target. The range image is an image in which each pixel has depth information. The range image measurement unit is formed from the first illumination unit 1, the image sensing unit 3, and the processing unit 4. The first illumination unit 1 illuminates the work 5 with light of a first wavelength having a pattern. The image sensing unit 3 captures the pattern projected from the first illumination unit 1 onto the work 5 from a direction different from that of the first illumination unit 1, thereby obtaining a range image. Based on the principle of triangulation, the processing unit 4 obtains the 3D information of the work 5 from the range image captured by the image sensing unit 3.

In the range image measurement unit, the pattern projected from the first illumination unit 1 onto the work 5 enables the obtainment of the 3D information of the work 5 from one range image. This is because the measurement apparatus 100 is an apparatus that assumes measuring the position or attitude of the work 5 while moving a robot. In a measurement method of obtaining the 3D information of the work 5 from a plurality of range images, a field shift occurs between the range images in accordance with the movement of the robot, and 3D information cannot accurately be obtained. As a pattern that enables the obtainment of 3D information from one range image, a dot line pattern encoded by dots, as shown in FIG. 2, is known. The line pattern and the range image are associated based on the positional relationship of the dots of the dot line pattern projected onto the work 5, thereby obtaining the 3D information of the work 5 from one range image. Note that in this embodiment, the dot line pattern has been described as a detailed example of the pattern projected from the first illumination unit 1 onto the work 5. However, the pattern projected from the first illumination unit 1 onto the work 5 is not limited to the dot line pattern, and any other pattern that enables the obtainment of the 3D information of the work 5 from one range image is usable.

In this embodiment, the first illumination unit 1 includes a light source 9, an illumination optical system 10, a mask 11, and a projection optical system 12. The illumination optical system 10 is an optical system configured to uniformly illuminate, for example, Koehler-illuminate the mask 11 with light of the first wavelength emitted by the light source 9. (A transmitting portion corresponding to) a pattern to be projected onto the work 5 is formed on the mask 11 by, for example, chromium-plating a glass substrate. In this embodiment, a dot line pattern is formed on the mask 11, as shown in FIG. 2. The projection optical system 12 is an optical system configured to project the image of the pattern formed on the mask 11 onto the work 5.

As described above, the first illumination unit 1 causes the illumination optical system 10 to uniformly illuminate the mask 11 with the light from the light source 9, and causes the projection optical system 12 to form an image of the light from the pattern of the mask 11 on the work 5. In this embodiment, a method of projecting the pattern onto the work 5 using the mask 11 (fixed mask pattern method) has been described. However, the present invention is not limited to this. For example, the pattern may be projected not the work 5 using a DLP (Digital Light Processing) projector or a liquid crystal projector.

The grayscale image measurement unit will be described. A grayscale image is an image obtained by capturing the uniformly illuminated work 5. In this embodiment, an edge corresponding to a contour or ridge of the work 5 is detected from the grayscale image, and the edge is used as an image feature when obtaining the position or attitude of the work 5. The grayscale image measurement unit is formed from the second illumination unit 2, the image sensing unit 3, and the processing unit 4. The second illumination unit 2 uniformly illuminates the work 5 with light of a second wavelength different from the first wavelength. The image sensing unit 3 captures the work 5 uniformly illuminated by the second illumination unit 2 and obtains the grayscale image. The processing unit 4 performs edge detection processing for the grayscale image captured by the image sensing unit 3, thereby obtaining the edge of the work 5.

The second illumination unit 2 includes a plurality of light sources 13. In this embodiment, to implement ring illumination, the second illumination unit 2 is formed by arranging the plurality of light sources 13 in a ring. The second illumination unit 2 uniformly illuminates the work 5 by ring illumination so as not to form a shadow on the work 5. However, the illumination method of uniformly illuminating the work 5 is not limited to ring illumination, and coaxial epi-illumination or dome illumination may be used.

The image sensing unit 3 that is a main unit of the measurement apparatus 100 will be described next. The image sensing unit 3 captures the work 5 simultaneously illuminated with the light of the first wavelength from the first illumination unit 1 and the light of the second wavelength from the second illumination unit 2, and simultaneously obtains the range image (a first image corresponding to the light of the first wavelength) and the grayscale image (a second image corresponding to the light of the second wavelength). The image sensing unit 3 includes an imaging optical system 6 and an image sensor 7. The imaging optical system 6 is an optical system configured to form, on the image sensor 7, an image of the pattern projected onto the work 5 and an image of the work 5 uniformly illuminated by ring illumination. The image sensor 7 includes one pixel unit in which a plurality of pixels adjacent to each other are arranged in the matrix (vertical and horizontal directions). The image sensor 7 is an image sensor configured to capture the range image or grayscale image, and is formed from, for example, a CMOS sensor or a CCD sensor. The image sensor 7 captures the measurement target illuminated with the light of the first wavelength and the light of the second wavelength by the one pixel unit of the image sensor 7.

In this embodiment, different wavelengths are given to illumination light for the range image and that for the grayscale image, and each pixel of the one pixel unit of the image sensor 7 captures the light of either wavelength, thereby obtaining the range image and the grayscale image by one sensor, that is, one pixel unit. It is therefore possible to provide a measurement apparatus excellent in terms of cost, size, and stability, as compared to a conventional technique (multiple sensor method) that needs two independent sensors (a grayscale image sensor and a range image sensor).

To implement this, the measurement apparatus 100 according to this embodiment includes an optical member 8 that functions as a wavelength selection element. The optical member 8 is arranged between the work 5 and the image sensor 7. The optical member 8 separates the light of the first wavelength from the first illumination unit 1 and the light of the second wavelength from the second illumination unit 2, and makes one of the light of the first wavelength and the light of the second wavelength enter each pixel of the one pixel unit of the image sensor 7. The optical member 8 makes one of the light of the first wavelength and the light of the second wavelength enter each pixel of the one pixel unit of the image sensor 7 such that the number of pixels that the light of the first wavelength enters becomes equal to or larger than the number of pixels that the light of the second wavelength enters. At this time, at least one pixel that the light of the first wavelength enters and at least one pixel that the light of the second wavelength enters exist in an arbitrary region of 2×2 pixels adjacent to each other out of the pixels of the one pixel unit of the image sensor 7. Note that some pixels of the image sensor 7 may form pixels that do not aim at obtaining the range image and the grayscale image, and not all pixels of the one pixel unit of the image sensor 7 need receive one of the light of the first wavelength and the light of the second wavelength. In other words, one of the light of the first wavelength and the light of the second wavelength is made to enter effective pixels usable to obtain the range image and the grayscale image.

In this embodiment, the optical member 8 is formed from a wavelength separation filter in which a plurality of filters corresponding to the pixels of the one pixel unit of the image sensor 7 are arranged. The plurality of filters include a first filter that transmits the light of the first wavelength and a second filter that transmits the light of the second wavelength. More specifically, as the optical member 8, a wavelength separation filter 8A is used in which a region of 2×2 pixels adjacent to each other, including three pixels that light in the blue wavelength band enters and one pixel that light in the red wavelength band enters, is periodically formed, as shown in FIG. 3. Note that here, the first wavelength is the blue wavelength band, and the second wavelength is the red wavelength band. Referring to FIG. 3, B represents a first filter that transmits light in the blue wavelength band, and R represents a second filter that transmits light in the red wavelength band. Hence, in the pixels of the one pixel unit of the image sensor 7, a structure (basic structure) of 2×2 pixels in which the number of pixels (to be also referred to as "blue pixels hereinafter) for the range image is 3, and the number of pixels (to be also referred to as "red pixels hereinafter) for the grayscale image is 1 is periodically formed.

When an image is obtained using only the blue pixels of the image sensor 7, a range image in which the red pixels are missing is obtained, as shown in FIG. 4. That is, the range image obtained using only the blue pixels of the image sensor 7 includes effective pixels (blue pixels) that the light in the blue wavelength band has entered and missing pixels (red pixels) that the light in the blue wavelength band has not entered. On the other hand, when an image is obtained using only the red pixels of the image sensor 7, a grayscale image in which the blue pixels are missing is obtained, as shown in FIG. 5. That is, the grayscale image obtained using only the red pixels of the image sensor 7 includes effective pixels (red pixels) that the light in the red wavelength band has entered and missing pixels (blue pixels) that the light in the red wavelength band has not entered.

For each of the range image and the grayscale image, the processing unit 4 interpolates the missing pixels using the effective pixels. For example, the brightness value of a missing pixel is interpolated using the brightness values of effective pixels existing around the missing pixel. This makes it possible to generate a range image and a grayscale image each having the same resolution as an image obtained using all pixels of the image sensor 7.

In this embodiment, interpolation of a missing pixel is performed by selecting effective pixels from eight neighboring pixels adjacent to the missing pixel, as shown in FIG. 6, and interpolating the brightness value of the missing pixel by the average value of the brightness values of the effective pixels. More specifically, let I be the interpolated brightness value of the missing pixel, k be the number of selected effective pixels, and $I_n$ (n=1 to k) be the brightness value of an nth selected effective pixel. The missing pixel is interpolated based on $$I = \frac{1}{k}\sum_{n=1}^{k} I_n \tag{1}$$

When such interpolation processing is performed for each of the range image and the grayscale image, an image having the same resolution as in a case in which an image is obtained using all pixels of the image sensor 7 can be generated. Note that in this embodiment, a case in which the brightness value of a missing pixel is interpolated using the average value of the brightness values of neighboring effective pixels adjacent to the missing pixel has been described. However, the present invention is not limited to this, and the missing pixel may be interpolated by another interpolation processing.

In this embodiment, to suppress a decrease in the measurement accuracy of the range image as compared to the conventional technique (multiple sensor method), the pixel ratio in the image sensor 7 is set such that the number of pixels for the range image becomes equal to or larger than the number of pixels for the grayscale image. In other words, the wavelength separation filter 8A makes one of the light in the blue wavelength band and the light in the red wavelength band enter each pixel of the one pixel unit of the image sensor 7 such that the number of pixels that the light in the blue wavelength band enters becomes equal to or larger than the number of pixels that the light in the red wavelength band enters.

Figure 7:
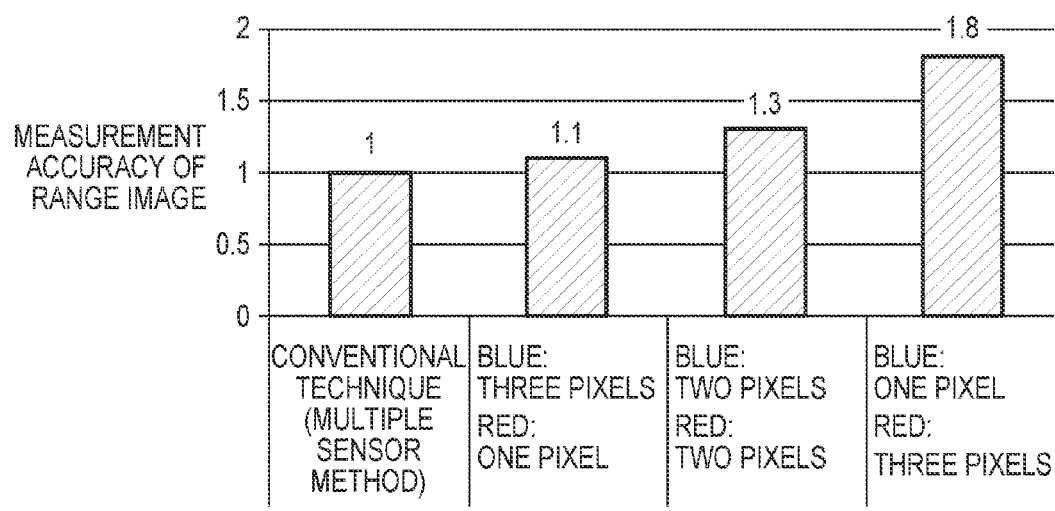
FIG. 7 is a view showing the relationship between the measurement accuracy of the range image and the ratio of the number of pixels for the range image to that for the grayscale image.

FIG. 7 is a view showing the relationship between the measurement accuracy of the range image and the ratio of the number of pixels (blue pixels) for the range image to the number of pixels (red pixels) for the grayscale image. FIG. 7 shows the rate of a decrease in the measurement accuracy in a case in which the measurement accuracy of the range image in the conventional technique (multiple sensor method) is set to 1. Referring to FIG. 7, the rate of the decrease in the measurement accuracy of the range image caused by the decrease in the number of pixels for the range image is as low as 1.3 times if the number of pixels for the range image is 2 or more. However, when the number of pixels for the range image is 1, the rate of the decrease in the measurement accuracy of the range image is 1.8 times. The rate of the decrease in the measurement accuracy is as large as almost twice. Hence, to suppress the decrease in the measurement accuracy of the range image, it is important to set the pixel ratio in the image sensor 7 such that the number of pixels for the range image becomes equal to or larger than the number of pixels for the grayscale image.

The reason why the measurement accuracy of the range image is emphasized will be described here. For the grayscale image, the illuminance to the work 5 can be controlled by the number of light sources 13 that implement ring illumination of the second illumination unit 2. Hence, the measurement accuracy of the grayscale image can be improved by increasing the number of light sources 13 as needed. On the other hand, for the range image, since the numerical aperture (NA) of the projection optical system 12 is limited to ensure the depth of field of the pattern projected from the first illumination unit 1, the brightness of the light source 9 limits the illuminance to the work 5. However, since the increase in the brightness of the light source 9 is limited, the measurement accuracy of the range image is limited by the brightness of the light source 9. Hence, to suppress the decrease in the measurement accuracy of the final position or attitude of the work 5 as compared to the conventional technique (multiple sensor method), it is important to suppress the decrease in the measurement accuracy of the range image as the accuracy limiting factor.

Additionally, as described above, a wavelength difference is provided between the illumination light for the range image and that for the grayscale image to do wavelength separation. In general, the brightness of a light source largely depends on the wavelength. Hence, to suppress the decrease in the measurement accuracy of the range image for which the brightness of the light source 9 acts as the accuracy limiting factor, it is important to make the brightness of the light source 9 for the range image (the brightness of the light of the first wavelength) higher than the brightness of the light sources 13 for the grayscale image (the brightness of the light of the second wavelength). More specifically, since the highest brightness can be obtained by a blue light source at the present time, a blue light source is used as the light source 9.

Figure 8:
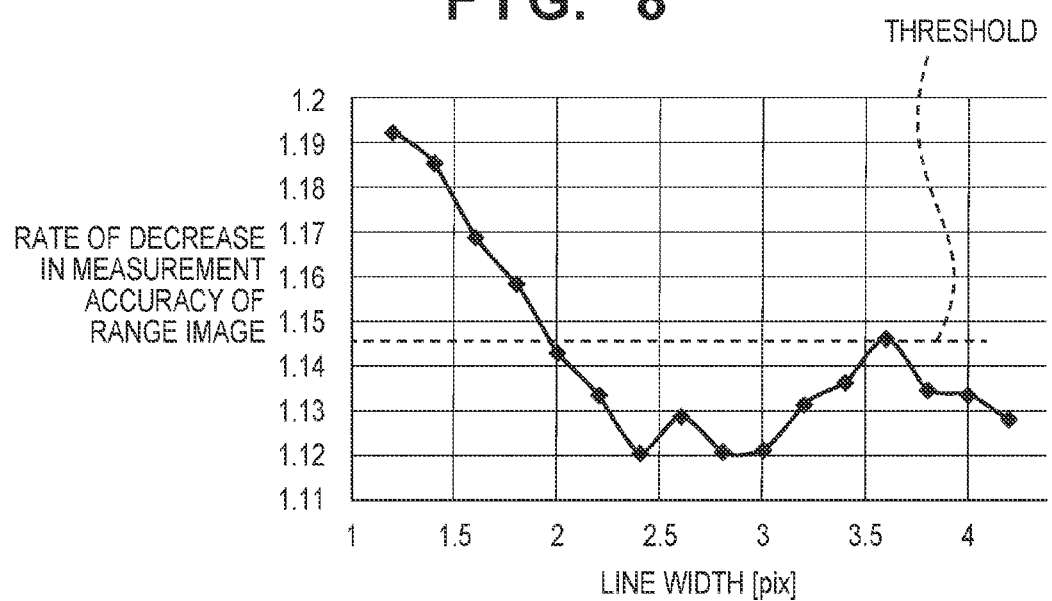
FIG. 8 is a view showing the relationship between the line width, on an image sensor, of a pattern projected onto a work and the rate of a decrease in the measurement accuracy of the range image.

FIG. 8 is a view showing the relationship between the line width, on the image sensor, of each of a plurality of lines of the pattern projected onto the work 5 and the rate of a decrease in the measurement accuracy of the range image obtained by the image sensor 7 in a case in which the wavelength separation filter 8A shown in FIG. 3 is used. Referring to FIG. 8, when each line of the pattern projected onto the work 5 has a small line width on the image sensor, the rate of the decrease in the measurement accuracy of the image obtained by the image sensor 7 increases. In general, the measurement accuracy in the pattern projection method depends on the contrast of the image of the pattern projected onto the work 5 from the viewpoint of SN. In addition, since the contrast of the image of the pattern lowers most at two ends of the measurement range (optical axis direction) due to the influence of an optical blur, the measurement accuracy at the two ends of the measurement range is the lowest, and determines the measurement accuracy of the apparatus. Hence, to suppress the decrease in the measurement accuracy of the measurement apparatus 100, it is important to suppress the decrease in the measurement accuracy at the two ends of the measurement range.

In this embodiment, each of the plurality of lines of the pattern projected onto the work 5 is set so as to have a line width that decreases the rate of the decrease in the measurement accuracy of the range image, more specifically, a line width of two or more pixels on the image sensor (in the one pixel unit). In particular, it is important that each line of the pattern projected onto the work 5 has a line width of two or more pixels on the image sensor at the two ends of the measurement range (that is, in a case in which the work 5 defocuses from the best focus position).

Note that in this embodiment, the line width, on the image sensor, of each line of the pattern projected onto the work 5 is determined from a condition for converging the rate of the decrease in the measurement accuracy of the range image. Referring to FIG. 8, the rate of the decrease in the measurement accuracy of the range image converges between approximately 1.12 and approximately 1.145. Hence, in this embodiment, the threshold is set to 1.145. Based on the condition that meets the threshold, the line width, on the image sensor, of each line of the pattern projected onto the work 5 is set to 2 or more pixels.

To prevent a small image feature such as a dot from disappearing, it is necessary to arrange at least one effective pixel in a region that forms the image feature on the image sensor. However, if the image feature is a dot of 1×1 pixel on the image sensor, all pixels of the image sensor 7 need to be effective pixels. This is contrary to the basic concept of the measurement apparatus 100 according to this embodiment, that is, simultaneously obtaining the range image and the grayscale image by one image sensor 7. In this embodiment, the minimum guarantee size of the image feature is set to 2×2 pixels, and at least one pixel for the range image and at least one pixel for the grayscale image exist in an arbitrary region of 2×2 pixels adjacent to each other out of the pixels of the one pixel unit of the image sensor 7. This can prevent a small image feature from disappearing as much as possible.

Figure 9:
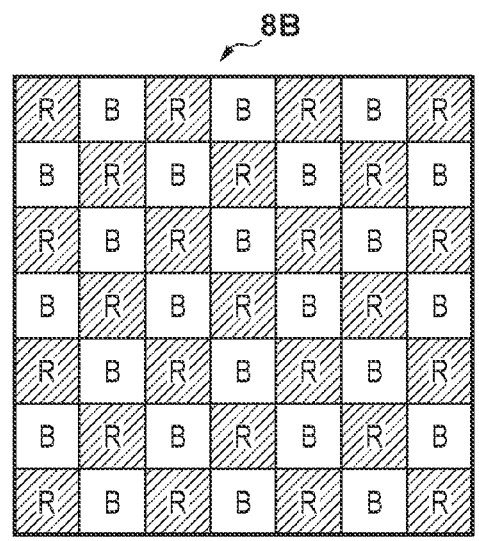
FIG. 9 is a view showing an example of the arrangement of a wavelength separation filter that is an optical member in the measurement apparatus shown in FIG. 1.

In this embodiment, the wavelength separation filter 8A shown in FIG. 3 is used as the optical member 8 functioning as a wavelength separation element. However, the present invention is not limited to this. It is only necessary that in the pixels of the one pixel unit of the image sensor 7, the number of pixels for the range image is equal to or larger than the number of pixels for the grayscale image, and at least one pixel for the range image and at least one pixel for the grayscale image exist in an arbitrary region of 2×2 pixels, as described above. Hence, a wavelength separation filter 8B shown in FIG. 9 may be used such that pixels for the range image (pixels that the light in the blue wavelength band enters) and pixels for the grayscale image (pixels that the light in the red wavelength band enters) exist alternately (checkerwise) in the pixels of the one pixel unit of the image sensor 7. Referring to FIG. 9, B represents a first filter that transmits light in the blue wavelength band, and R represents a second filter that transmits light in the red wavelength band.

Figure 10:
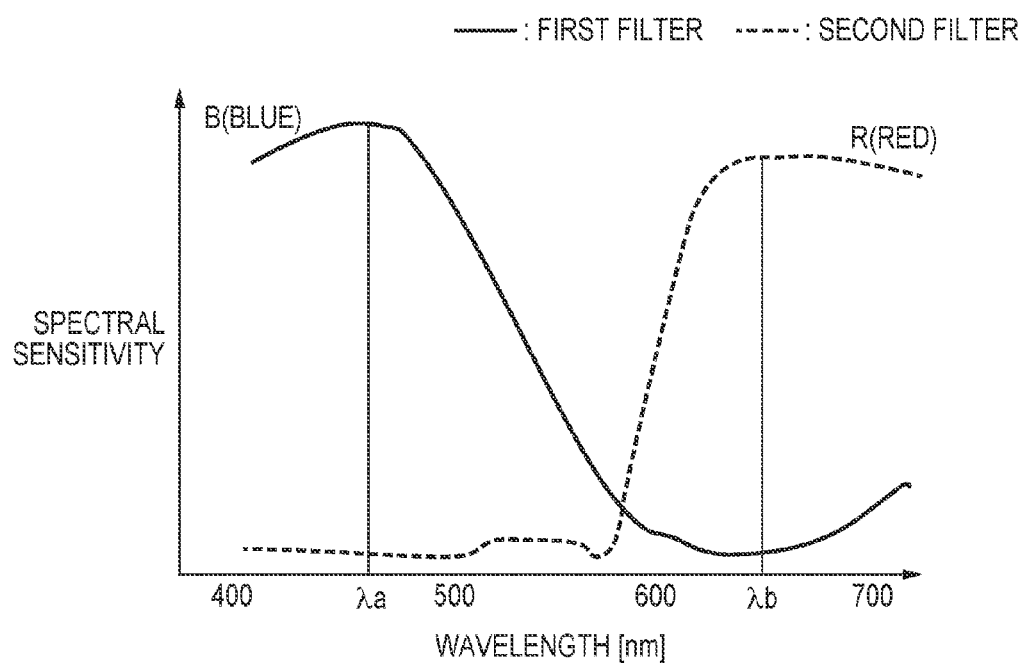
FIG. 10 is a view showing an example of the spectral sensitivity characteristics of color filters.

In this embodiment, the first wavelength for the range image is the blue wavelength band, and the second wavelength for the grayscale image is the red wavelength band. To accurately measure the position or attitude of the work 5, the wavelengths to be selected as the first wavelength and the second wavelength need to be considered. FIG. 10 is a view showing an example of the spectral sensitivity characteristics of color filters. FIG. 10 shows the spectral sensitivity characteristics of color filters applied to the wavelength separation filter 8A or wavelength separation filter 8B, that is, the spectral sensitivity characteristic of the first filter that transmits light in the blue wavelength band, and the spectral sensitivity characteristic of the second filter that transmits light in the red wavelength band.

Referring to FIG. 10, each of the first filter and the second filter has a broad spectral sensitivity characteristic. For this reason, light of a single wavelength is detected not by one of the blue and red pixels but by both pixels at different sensitivities. Hence, even when the range image and the grayscale image are obtained using light beams of different wavelengths, both images are obtained in a mixed state in accordance with the spectral sensitivities of the first filter and the second filter. If the range image and the grayscale image are mixed, and crosstalk occurs, a pattern may erroneously be recognized as an edge, or an edge may erroneously be recognized as a pattern, affecting the measurement accuracy. Crosstalk means noise (crosstalk noise) generated when one of light in the blue wavelength band and light in the red wavelength band enters a pixel (pixel of interest) that the other light should enter.

To reduce the influence of crosstalk on the measurement accuracy, a wavelength that minimizes the ratio of crosstalk is selected for each of the range image and the grayscale image. For example, when the color filters (the first filter and the second filter) applied to the wavelength separation filter 8A or wavelength separation filter 8B have the spectral sensitivity characteristics shown in FIG. 10, the first wavelength for the range image is set to λa [nm], and the second wavelength for the grayscale image is set to λb [nm]. This can minimize the noise ratio in each of the range image and the grayscale image and suppress the influence of crosstalk on the measurement accuracy to the minimum. Note that here, the influence of crosstalk on the measurement accuracy is suppressed to the minimum. However, to improve the final measurement accuracy, not only the influence of crosstalk but also the influence of light amounts on the measurement accuracy needs to be taken into consideration. Hence, actually, the wavelengths are selected such that the light amounts (spectral sensitivities) are maximized while suppressing the influence of crosstalk on the measurement accuracy.

To suppress the influence of crosstalk on the measurement accuracy, the crosstalk is estimated from adjacent pixels located around the pixel of interest and corrected based on the spectral sensitivity characteristic of the wavelength separation filter 8A or wavelength separation filter 8B. In other words, for each of the range image and the grayscale image, the processing unit 4 can obtain crosstalk generated in the pixel of interest and correct the brightness value of the pixel of interest using the crosstalk. At this time, the processing unit 4 can obtain crosstalk generated in the pixel of interest based on the brightness values of adjacent pixels located around the pixel of interest and the spectral sensitivity characteristic of the wavelength separation filter 8A or wavelength separation filter 8B.

Figure 11:
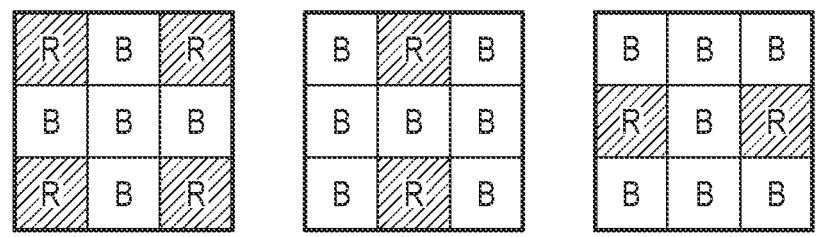
FIG. 11 is a view showing the positional relationship between pixels for the range image and those for the grayscale image.

Correction of crosstalk in the range image will be described in detail. When the wavelength separation filter 8A shown in FIG. 3 is used, and 3×3 pixels are extracted with respect to one pixel of interest out of the blue pixels for the range image as the center, three different positional relationships can be obtained between the blue pixels for the range image and the red pixels for the grayscale image, as shown in FIG. 11. Referring to FIG. 11, the number of red pixels adjacent to the blue pixel as the pixel of interest is two or four. To remove the influence of light in the red wavelength band for the grayscale image on the blue pixel as the pixel of interest, the average value of the brightness values of the two or four red pixels adjacent to the blue pixel is obtained, and correction is performed based on the spectral sensitivity characteristics shown in FIG. 10. More specifically, let $I_b$ be the brightness value of the blue pixel before crosstalk correction, $I_{ra}$ be the average value of the brightness values of the adjacent red pixels, and $I_b'$ be the brightness value of the blue pixel after crosstalk correction. Also let $\lambda_2$ be the red wavelength band for the grayscale image, $T_b(\lambda)$ be the transmittance of the blue pixel at the wavelength λ, and $T_r(\lambda)$ be the transmittance of the red pixel at the wavelength λ. In this case, crosstalk is corrected based on $$I_b' = I_b - I_{ra} \cdot \frac{T_b(\lambda_2)}{T_r(\lambda_2)} \quad (2)$$

Figure 12:
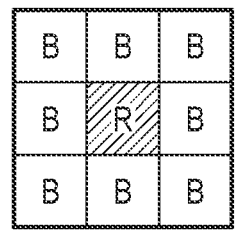
FIG. 12 is a view showing the positional relationship between pixels for the grayscale image and those for the range image.

Correction of crosstalk in the grayscale image will be described in detail. When the wavelength separation filter 8A shown in FIG. 3 is used, and 3×3 pixels are extracted with respect to one pixel of interest out of the red pixels for the grayscale image as the center, one positional relationship can be obtained between the red pixel for the grayscale image and the blue pixels for the range image, as shown in FIG. 12. Referring to FIG. 12, the number of blue pixels adjacent to the red pixel as the pixel of interest is eight. To remove the influence of light in the blue wavelength band for the range image on the red pixel as the pixel of interest, the average value of the brightness values of the eight blue pixels adjacent to the red pixel is obtained, and correction is performed based on the spectral sensitivity characteristics shown in FIG. 10. More specifically, let $I_r$ be the brightness value of the red pixel before crosstalk correction, $I_{ba}$ be the average value of the brightness values of the adjacent blue pixels, $I_r'$ be the brightness value of the red pixel after crosstalk correction, and $\lambda_1$ be the blue wavelength band for the range image. In this case, crosstalk is corrected based on $$I_r' = I_r - I_{ba} \cdot \frac{T_r(\lambda_1)}{T_b(\lambda_1)} \quad (3)$$

As described above, the measurement apparatus 100 according to this embodiment can separate the range image and the grayscale image by the wavelength difference and simultaneously obtain them by one image sensor 7, and is therefore more advantageous than the conventional technique (multiple sensor method) from the viewpoint of cost, size, or stability. Additionally, in the measurement apparatus 100 according to this embodiment, the number of pixels for the range image is equal to or larger than the number of pixels for the grayscale image. Hence, the measurement apparatus 100 can suppress a decrease in the measurement accuracy of the range image as the accuracy limiting factor and suppress a decrease in the final measurement accuracy of the position/attitude of the work 5 while ensuring advantage over the conventional technique in terms of cost, size, and stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046345 filed on Mar. 9, 2015, which is hereby incorporated by reference herein in its entirety.

What is claimed is:

1. A measurement apparatus for measuring one of a position and an attitude of a measurement target, comprising:
a first illumination unit configured to illuminate the measurement target with pattern light of a first wavelength;
a second illumination unit configured to illuminate the measurement target with light of a second wavelength different from the first wavelength;
an image sensor including one pixel unit in which a plurality of pixels adjacent to each other are arranged in a matrix and configured to capture the measurement target illuminated with the pattern light of the first wavelength and the light of the second wavelength by the one pixel unit and obtain a first image corresponding to the pattern light of the first wavelength and a second image corresponding to the light of the second wavelength by the one pixel unit;
an optical member arranged between the measurement target and the image sensor and configured to separate the pattern light of the first wavelength and the light of the second wavelength and make one of the pattern light of the first wavelength and the light of the second wavelength enter each pixel of the one pixel unit; and
a processing unit configured to obtain information of one of the position and the attitude of the measurement target based on the first image and the second image.

2. The apparatus according to claim 1, wherein the optical member makes one of the pattern light of the first wavelength and the light of the second wavelength enter each pixel of the one pixel unit such that the number of pixels that the pattern light of the first wavelength enters becomes not less than the number of pixels that the light of the second wavelength enters.

3. The apparatus according to claim 1, wherein the optical member makes one of the pattern light of the first wavelength and the light of the second wavelength enter each pixel of the one pixel unit such that at least one pixel that the pattern light of the first wavelength enters and at least one pixel that the light of the second wavelength enters exist in an arbitrary region of 2×2 pixels adjacent to each other in the one pixel unit.

4. The apparatus according to claim 1, wherein the optical member includes a wavelength separation filter in which a plurality of filters corresponding to the pixels of the one pixel unit are arranged, and
the plurality of filters include a first filter configured to transmit the pattern light of the first wavelength and a second filter configured to transmit the light of the second wavelength.

5. The apparatus according to claim 1, wherein a brightness of the pattern light of the first wavelength is higher than a brightness of the light of the second wavelength.

6. The apparatus according to claim 1, wherein the pattern light includes light of a plurality of lines, and
each of the plurality of lines has a line width of not less than two pixels in the one pixel unit.

7. The apparatus according to claim 6, wherein in a case in which the measurement target defocuses from a best focus position, each of the plurality of lines has the line width of not less than two pixels in the one pixel unit.

8. The apparatus according to claim 1, wherein the optical member makes one of the pattern light of the first wavelength and the light of the second wavelength enter each pixel of the one pixel unit such that a region of 2×2 pixels adjacent to each other, including three pixels that the pattern light of the first wavelength enters and one pixel that the light of the second wavelength enters, is periodically formed in the one pixel unit.

9. The apparatus according to claim 1, wherein the optical member makes one of the pattern light of the first wavelength and the light of the second wavelength enter each pixel of the one pixel unit such that the pixels that the pattern light of the first wavelength enters and the pixels that the light of the second wavelength enters exist alternately in the one pixel unit.

10. The apparatus according to claim 1, wherein the first image includes an effective pixel that the pattern light of the first wavelength enters and a missing pixel that the pattern light of the first wavelength does not enter,
the second image includes an effective pixel that the light of the second wavelength enters and a missing pixel that the light of the second wavelength does not enter, and
the processing unit interpolates the missing pixel using the effective pixel for each of the first image and the second image.

11. The apparatus according to claim 10, wherein for each of the first image and the second image, the processing unit interpolates the missing pixel by an average value of brightness values of a plurality of effective pixels existing around the missing pixel.

12. The apparatus according to claim 1, wherein for each of the first image and the second image, the processing unit obtains noise generated when one of the pattern light of the first wavelength and the light of the second wavelength enters a pixel of interest that the other light should enter, and corrects a brightness value of the pixel of interest using the noise.

13. The apparatus according to claim 12, wherein the processing unit obtains the noise based on a brightness value of a pixel located around the pixel of interest and a spectral sensitivity characteristic of the optical member.

* * * * *